US006889245B2

(12) United States Patent
Taylor et al.

(10) Patent No.: US 6,889,245 B2
(45) Date of Patent: May 3, 2005

(54) TIGHTLY-COUPLED DISK-TO-CPU STORAGE SERVER

(75) Inventors: Clement G. Taylor, Plainsboro, NJ (US); Danny Chin, Princeton Junction, NJ (US); Jesse S. Lerman, Princeton, NJ (US); Steven Zack, Burlington, NJ (US); William Ashley, Sunnyvale, CA (US)

(73) Assignee: Sedna Patent Services, LLC, Philadelphia, PA (US)

( * ) Notice: Subject to any disclaimer, the term of this patent is extended or adjusted under 35 U.S.C. 154(b) by 483 days.

(21) Appl. No.: 09/911,591

(22) Filed: Jul. 24, 2001

(65) Prior Publication Data

US 2001/0056480 A1 Dec. 27, 2001

Related U.S. Application Data

(63) Continuation of application No. 09/363,670, filed on Jul. 29, 1999, now Pat. No. 6,289,376.
(60) Provisional application No. 60/127,116, filed on Mar. 31, 1999.

(51) Int. Cl.[7] ............................................. G06F 15/16
(52) U.S. Cl. ..................... 709/203; 709/238; 711/114
(58) Field of Search ...................... 709/203, 217–219, 709/238; 711/114, 100, 168; 710/2, 6; 714/5–7, 12; 370/230, 395, 403, 411, 462, 535

(56) References Cited

U.S. PATENT DOCUMENTS

| | | | |
|---|---|---|---|
| 4,888,691 A | 12/1989 | George et al. ............... 364/300 |
| 5,220,653 A | 6/1993 | Miro .......................... 395/275 |
| 5,297,269 A * | 3/1994 | Donaldson et al. ......... 711/145 |
| 5,446,855 A | 8/1995 | Dang et al. .................. 395/401 |
| 5,504,873 A * | 4/1996 | Martin et al. ............... 711/111 |
| 5,603,063 A | 2/1997 | Au ............................. 395/872 |
| 5,617,425 A * | 4/1997 | Anderson .................... 714/710 |
| 5,644,786 A | 7/1997 | Gallagher et al. .......... 395/850 |
| 5,671,377 A | 9/1997 | Bleidt et al. ................. 395/328 |
| 5,694,615 A * | 12/1997 | Thapar et al. ................. 710/2 |
| 5,737,549 A * | 4/1998 | Hersch et al. ............... 709/203 |
| 5,742,599 A * | 4/1998 | Lin et al. ............... 370/395.65 |
| 5,790,775 A * | 8/1998 | Marks et al. ................... 714/9 |
| 5,815,662 A * | 9/1998 | Ong ............................. 725/92 |
| 5,862,313 A * | 1/1999 | Johnson et al. ................ 714/6 |
| 5,862,403 A * | 1/1999 | Kanai et al. .................... 710/6 |
| 5,892,913 A | 4/1999 | Adigo et al. ................. 709/219 |
| 5,922,077 A | 7/1999 | Espy et al. ...................... 714/7 |
| 5,923,839 A * | 7/1999 | Munetoh et al. .............. 714/48 |
| 5,996,014 A | 11/1999 | Uchihori et al. ............. 709/226 |
| 6,000,020 A | 12/1999 | Chin et al. ................... 711/162 |
| 6,070,251 A * | 5/2000 | Chong .......................... 714/12 |
| 6,076,105 A | 6/2000 | Wolf et al. .................. 709/223 |
| 6,289,376 B1 * | 9/2001 | Taylor et al. ................ 709/219 |
| 6,529,976 B1 * | 3/2003 | Fukuzawa et al. ............ 710/65 |
| 6,614,796 B1 * | 9/2003 | Black et al. .................. 370/403 |

* cited by examiner

Primary Examiner—Mehmet B. Geckil
(74) Attorney, Agent, or Firm—Moser, Patterson & Sheridan LLP (57) ABSTRACT

A storage server for efficiently retrieving data from a plurality of disks in response to user access requests. The server comprises a plurality of processors coupled to disjoint subsets of disks, and a custom non-blocking packet switch for routing data from the processors to users. By tightly coupling the processors to disks and employing an application-specific switch, congestion and disk scheduling bottlenecks are minimized. By making efficient use of bandwidth, the architecture is also capable of receiving real-time data streams from a remote source and distributing these data streams to requesting users. The architecture is particularly well suited to video-on-demand systems in which a video server stores a library of movies and users submit requests to view particular movies.

17 Claims, 6 Drawing Sheets

TIGHTLY-COUPLED DISK-TO-CPU STORAGE SERVER

This application is a continuation of U.S. patent application Ser. No. 09/363,670, filed on Jul. 29, 1999, now U.S. Pat. No. 6,289,376, and assigned to the same assignee as this application which application Ser. No. 09/363,670 claims the benefit of U.S. Provisional patent application Ser. No. 60/127,116, filed Mar. 31, 1999.

The present invention relates to a storage server for retrieving data from a plurality of disks in response to user access requests. In particular, the invention relates to a multi-processing architecture in which a plurality of processors are coupled to disjoint subsets of disks, and a non-blocking cross bar switch routes data from the processors to users.

BACKGROUND OF THE DISCLOSURE

A storage server allows users to efficiently retrieve information from large volumes of data stored on a plurality of disks. For example, a video-on-demand server is a storage server that accepts user requests to view a particular movie from a video library, retrieves the requested program from disk, and delivers the program to the appropriate user(s). In order to provide high performance, storage servers may employ a plurality of processors connected to the disks, allowing the server to service multiple user requests simultaneously. In such multi-processor servers, processors issue commands to any of the disks, and a multi-port switch connecting the processors to the disks routes these commands to the appropriate disk. Data retrieved from disk is similarly routed back to the appropriate processor via the switch. Such servers use non-deterministic data routing channels for routing data. To facilitate accurate data retrieval, these channels require a sub-system to arbitrate conflicts that arise during data routing.

There are a number of problems, however, associated with such multi-processor servers. First, the switch becomes a major source of latency. Since all data exchanged between the processors and disks pass through the switch and the data must be correctly routed to the appropriate destination, certain overhead processes must be accomplished to arbitrate routing conflicts and handle command and control issues. These overhead requirements cause a delay in data routing that produces data delivery latency. While it is possible to reduce such latency by reserving extra channel bandwidth, this approach dramatically increases the cost of the server. Second, the server is required to store all user requested data in a cache prior to delivery. Such a caching technique leads to poor cache efficiency wherein multiple copies of the same user data is stored in cache. These problems can significantly degrade the disk bandwidth and performance provided by the server, thereby limiting the number of users that can be supported by a given number of processors and disks. In commercial applications such as video-on-demand servers, however, it is imperative to maximize the number of users that can be supported by the server in order to achieve a reasonable cost-per-user such that the servers are economically viable.

Therefore, there is a need in the art for a multi-processor storage server that can service multiple access requests simultaneously, while avoiding the congestion, overhead, and disk scheduling bottlenecks that plague current systems.

SUMMARY OF THE INVENTION

The disadvantages associated with the prior art are overcome by a server comprising a plurality of server modules, each containing a single processor, that connect a plurality of Fibre Channel disk drive loops to a non-blocking cross bar switch such that deterministic data channels are formed connecting a user to a data source. Each server module is responsible for outputting data at the correct time, and with the proper format for delivery to the users. A non-blocking packet switch routes the data to a proper output of the server for delivery to users. Each server module supports a plurality of Fibre Channel loops. The module manages data on the disks, performs disk scheduling, services user access requests, stripes data across the disks coupled to its loop(s) and manages content introduction and migration. Since the server module processors never communicate with any disks connected to other processor modules, there is no processor overhead or time wasted arbitrating for control of the Fibre Channel loops. As a result, the server can make the most efficient use of available bandwidth by keeping the disks constantly busy.

The server modules transfer data read from the Fibre Channel loops to the non-blocking packet switch at the appropriate output rate. The packet switch then outputs data to a plurality of digital video modulators that distribute the data to requesting users. Data requests from the users are demodulated and coupled to the switch. The switch routes the requests to the server controller which in turn routes the requests to an appropriate server module that contains the requested data. In this manner, a user establishes a deterministic channel from their terminal (decoder) to the data source (disk drive) such that low latency data streaming is established.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
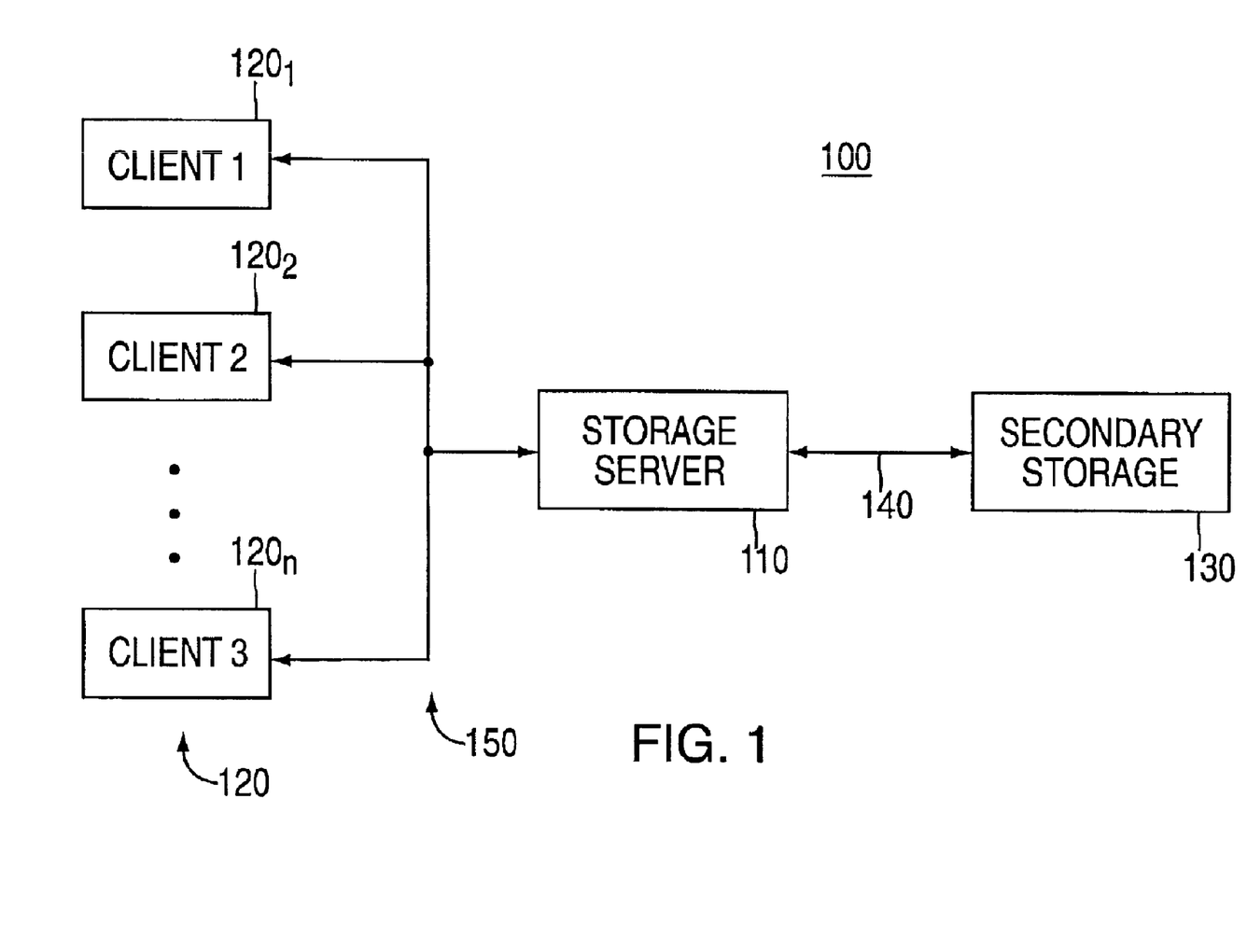
FIG. 1 depicts a high-level block diagram of a data retrieval system that includes a storage server incorporating the present invention.

FIG. 1 depicts a client/server data retrieval system 100 that employs a storage server 110 which accepts user access requests from clients 120 via data paths 150. Server 110 retrieves the requested data from disks within the server 110 and outputs the requested data to the user via data paths 150. Data streams from a remote source (secondary storage 130) are received by the storage server 110 via data path 140. The data streams from the secondary storage are generally stored within the storage server for subsequent retrieval by clients 120.

In a video on demand (VOD) application, the clients 120 are the users' transceivers (e.g., modems that contain video signal decoders and an associated communications transmitter that facilitate bidirectional data communications) and the data from the storage server is modulated in a format (e.g., quadrature amplitude modulation (QAM))that is carried to the clients via a hybrid-fiber-coax (HFC) network. The transceiver contains circuitry for producing data requests that are propagated to the storage server through the HFC network or some other communications channel (e.g., telephone system). In such a VOD system, the remote source may be a "live feed" or an "over the air" broadcast as well as a movie archive.

Figure 2:
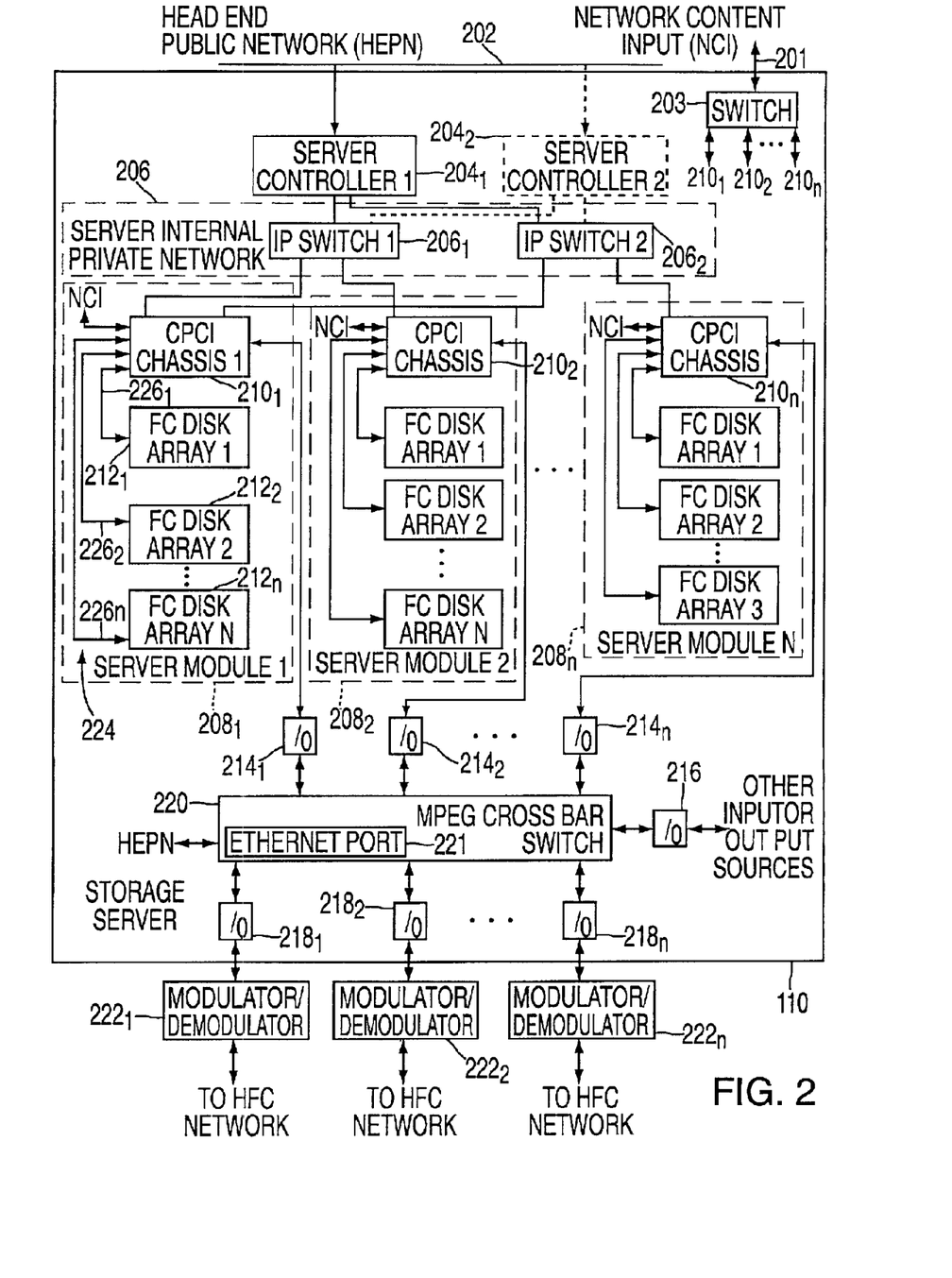
FIG. 2 depicts a detailed block of the storage server.

FIG. 2 depicts a detailed block diagram of the storage server 110 coupled to a plurality of data modulator/demodulator circuits $222_1$, $222_2$, . . . $222_n$ (collectively referred to as the modulator/demodulators 222). The storage server 110 comprises one or more server controllers 204, a server internal private network 206, a plurality of the server modules $208_1$, $208_2$, . . . $208_n$ (collectively referred to as the server modules 208), a plurality of input/output circuits 214, 218, and 216, and an non-blocking cross bar switch 220.

The server controller 204 forms an interface between the server internal private network 206 and a head end public network (HEPN) 202. The public network carries command and control signaling for the storage server 110. To provide system redundancy, the server contains more than one server controller 204 (e.g., a pair of parallel controllers $204_1$ and $204_2$). These server controllers 204 are general purpose computers that route control instructions from the public network to particular server modules that can perform the requested function, i.e., data transfer requests are addressed by the server controller 204 to the server module 208 that contains the relevant data. For example, the server controller 204 maintains a database that correlates content with the server modules 208 such that data migration from one server module 208 to another is easily arranged and managed. As discussed below, such content migration is important to achieving data access load balancing. Also, the server controller 204 monitors loading of content into the server modules 208 to ensure that content that is accessed often is uniformly stored across the server modules 208. Additionally, when new content is to be added to the storage server 110, the server controller 204 can direct the content to be stored in an underutilized server module 208 to facilitate load balancing. Additional content can be added through the HEPN or via the network content input (NCI) 201. The NCI is coupled to a switch 203 that directs the content to the appropriate server module 208. As further described below, the output ports of the switch 203 are coupled to the compact PCI chassis 210 within each of the server modules 208.

The server internal private (IP) network comprises a pair of redundant IP switches $206_1$ and $206_2$. These switches route data packets (i.e., packets containing command and control instructions, and the like) from the server controller 204 to the appropriate server module 208.

Each of the server modules 208 comprise a compact PCI (CPCI) chassis 210 and a plurality of fiber channel (FC) loops 224. Each of the FC loops 224 respectively comprises a disk array $212_1$, $212_2$, . . . $212_n$ and a bidirectional data path $226_1$, $226_2$ . . . $226_n$. To optimize communication bandwidth to the disk while enhancing redundancy and fault tolerance, the data is striped across the disk arrays 212 in accordance with a RAID standard, e.g., RAID-5. Data is striped in a manner that facilitates efficient access to the data by each of the server modules. One such method for striping data for a video-on-demand server that is known as "Carousel Serving" is disclosed in U.S. Pat. No. 5,671,377 issued Sep. 23, 1997. Since the data is striped across all of the FC loops in a given server module, the striping is referred to as being "loop striped." Such loop striping enables the server to be easily scaled to a larger size by simply adding addition server modules and their respective FC loops. Additional data content is simply striped onto the additional disk arrays without affecting the data or operation of the other server modules 208 in the storage server 110. The data accessed by the CPCI chassis 210 from the FC loops 224 is forwarded to the cross bar switch 220 via an input/output (I/O) circuit 214.

The cross bar switch 220 has a plurality of I/O ports that are each coupled to other circuits via I/O circuits 214, 216 and 218. The switch 220 is designed to route packetized data (e.g., MPEG data) from any port to any other port without blocking. The I/O circuits 214 couple the cross bar switch 220 to the server modules 208, the I/O circuit 216 couples the cross bar switch 220 to other sources of input output signals, and the I/O circuits 218 couple the cross bar switch 220 to the modulator/demodulator circuits 222. Although the I/O circuits can be tailored to interface with specific circuits, all the I/O circuits 214, 216, and 218 are generally identical. The I/O circuits format the data appropriately for routing through the cross bar switch 220 without blocking. The switch 220 also contains ETHERNET circuitry 221 for coupling data to the HEPN 202. For example, user requests for data can be routed from the switch 221 to the server modules 208 via the HEPN 202. As such, the I/O circuits 218 may address the user requests to the ETHERNET circuitry 221. Of course, the ETHERNET circuitry could be contained in the demodulator/modulator circuits 222 such that the user requests could be routed directly from the demodulators to the HEPN. The details of the switch 220 and its associated I/O circuits are disclosed below with respect to FIG. 5.

The modulator/demodulator circuits 222 modulate the data from I/O circuits 218 into a format that is compatible with the delivery network, e.g., quadrature amplitude modulation (QAM) for a hybrid fiber-coax (HFC) network. The modulator/demodulator circuits 222 also demodulate user commands (i.e., back channel commands) from the user. These commands have a relatively low data rate and may use modulation formats such as frequency shift key (FSK) modulation, binary phase shift key (BPSK) modulation, and the like. The demodulator circuits produce data request packets that are addressed by the I/O circuits 218 to an appropriate server module 208 such that the cross bar switch 220 routes the data request via the HEPN to a server module 208 that can implement the user's request for data.

Figure 3:
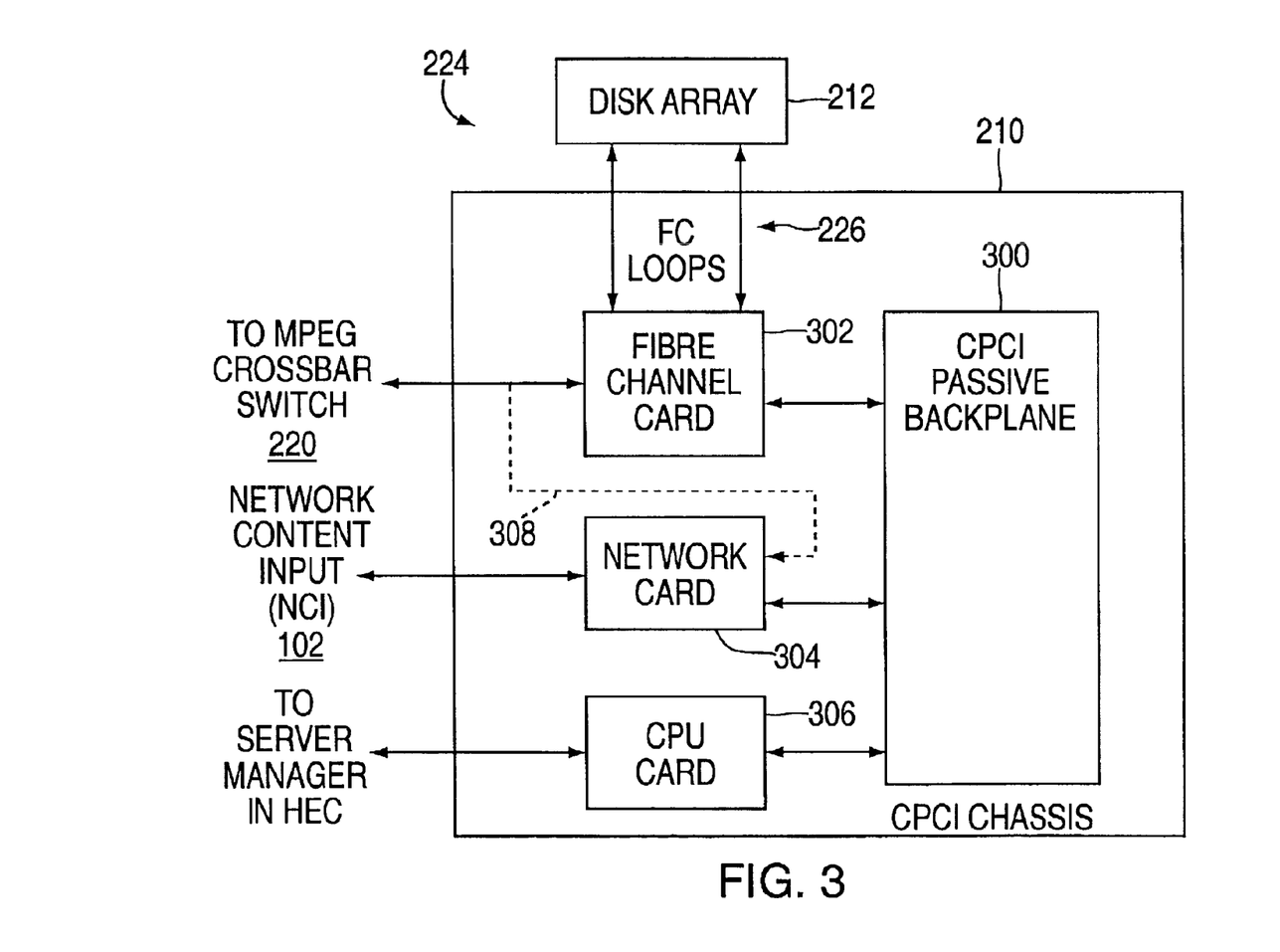
FIG. 3 depicts a block diagram of the CPCI chassis.

FIG. 3 depicts a block diagram of the architecture of one of the CPCI chassis 210. The CPCI chassis 210 comprises a fibre channel (FC) card 302, a CPU card 306, a network card 304, and a CPCI passive backplane 300. The backplane 300 interconnects the cards 302, 304, and 306 with one another in a manner that is conventional to CPCI backplane construction and utilization. As such, the CPU card 306, which receives instructions from the server controller (204 in FIG. 2), controls the operation of both the FC card 302 and the input network card 304. The CPU card 306 contains a standard microprocessor, memory circuits and various support circuits that are well known in the art for fabricating a CPU card for a CPCI chassis 210. The network card 304 provides a data stream from the NCI (201 in FIG. 2) that forms an alternative source of data to the disk drive array data. Furthermore, path 308 provides a high-speed connection from the cross bar switch 220 to the input network card. As such, information can be routed from the cross bar switch 220 through the network card 304 to the NCI 102 such that a communications link to a content source is provided.

The fibre channel card 302 controls access to the disk array(s) 212 that are coupled to the data paths 226 of each of the fibre channel loops 224. The card 302 directly couples data, typically video data, to and from the I/O circuits of the crossbar switch 220 such that a high speed dedicated data path is created from the array to the switch. The CPU card 306 manages the operation of the FC card 302 through a bus connection in the CPCI passive backplane 300.

Figure 4:
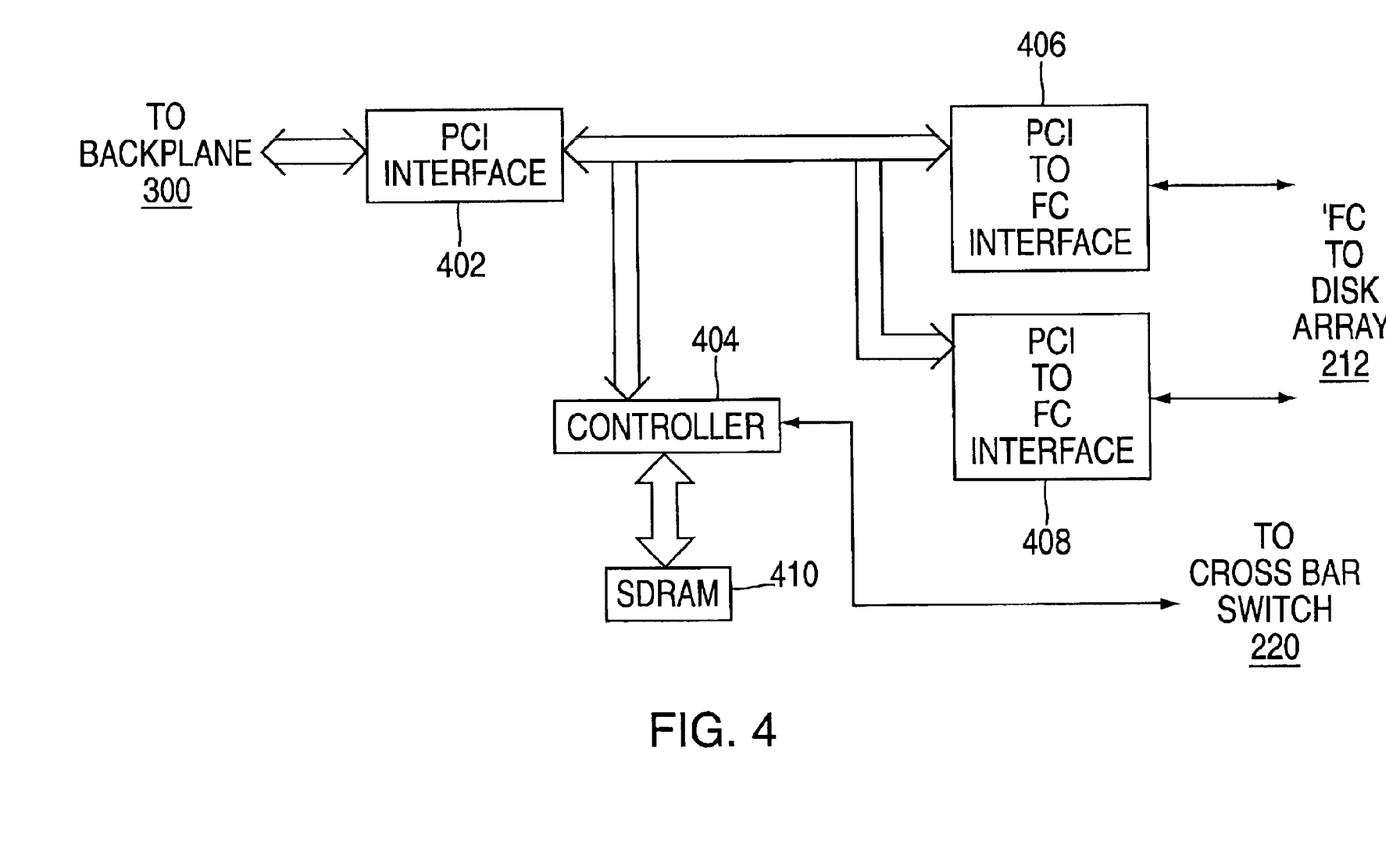
FIG. 4 depicts a block diagram of the Fibre Channel Card.

More specifically, FIG. 4 depicts a block diagram of the fibre channel card 302. The fibre channel card 302 comprises a PCI interface 402, a controller 404, a synchronous dynamic random access memory (SDRAM) 410, and a pair of PCI to FC interfaces 406 and 408. The PCI interface interacts with the PCI backplane 300 in a conventional manner. The PCI interface 402 receives command and control signals from the CPU card (306 in FIG. 3) that request particular data from the disk array(s) 212. The data requests are routed to the PCI to FC interfaces 406 and/or 408. The data requests are then routed to the disk array(s) 212 and the appropriate data is retrieved. Depending upon which loop contains the data, the accessed data is routed through a PCI to FC interface 406 or 408 to the controller 404. The data (typically, video data that is compressed using the MPEG-2 compression standard to form a sequence of MPEG data packets) is buffered by the controller 404 in the SDRAM 410. The controller retrieves the MPEG data packets from the SDRAM 410 at the proper rate for each stream, produces a data routing packet containing any necessary overhead information to facilitate packet routing through the switch (220 in FIG. 2), i.e., a port routing header is appended to the MPEG data packet. The data packet is then sent to the cross bar switch 220. The controller may also perform packet processing by monitoring and setting program identification (PID) codes.

Figure 5:
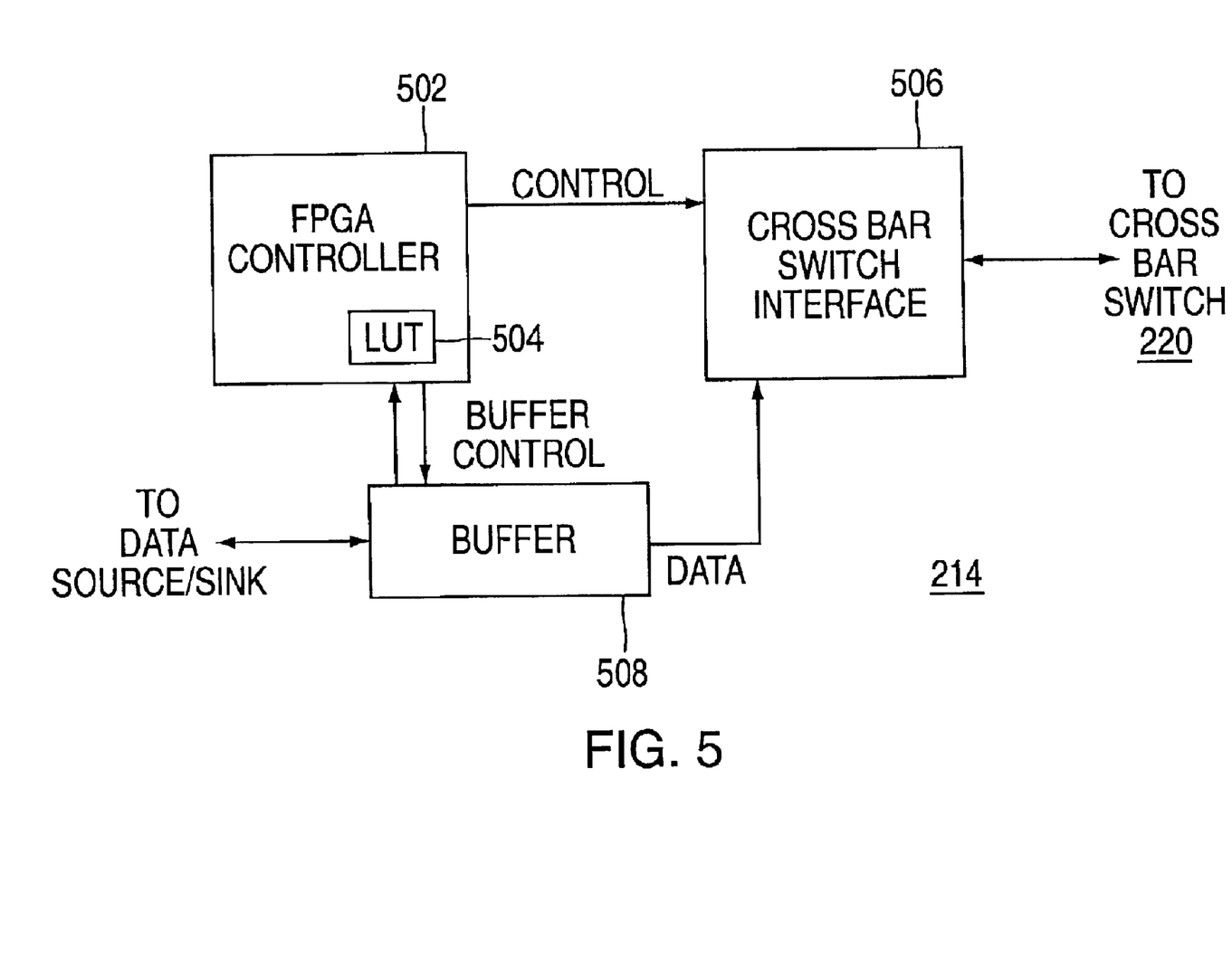
FIG. 5 depicts a block diagram of an I/O circuit for the non-blocking packet switch.

FIG. 5 depicts a block diagram of an I/O circuit 214, 216, or 218 for the MPEG cross bar switch 220. The cross bar switch 220 is a multi-port switch wherein data at any port can be routed to any other port. Generally, the switch is fault tolerant by having two switches in each of the I/O circuits 214, 216, 218 to provide redundancy. One such switch is the VSC880 manufactured by Vitesse Semiconductor Corporation of Camarillo, Calif. This particular switch is a 16 port bidirectional, serial crosspoint switch that handles 2.0 Gb/s data rates with an aggregate data bandwidth of 32 Gb/s. The I/O circuits that cooperate with this particular switch are fabricated using model VSC 870 backplane transceivers that are also available from Vitesse. The I/O circuit, for example, circuit 214, comprises a field programmable gate array (FPGA) controller 502, cross bar switch interface 506, and buffer 508. The cross bar switch interface 506 is, for example, a VSC 870 transceiver. The buffer 508 buffers data flowing into and out of the cross bar switch. The buffer 508 may comprise two first in, first out (FIFO) memories, one for each direction of data flow. The FPGA controller 502 controls the data access through the buffer 508 and controls the cross bar switch interface 506. Additionally, the controller 502 contains a look up table (LUT) 504 that stores routing information such as port addresses. The controller 502 monitors the buffered data and inspects the header information of each packet of data. In response to the header information and the routing information, the controller causes the buffered data to be passed through the cross bar switch interface and instructs the interface 506 regarding the routing required for the packet. The interface 506 instructs the cross bar switch as to which port on the cross bar switch 220 the data packet is to be routed.

The I/O circuits can perform certain specialized functions depending upon the component to which they are connected. For example, the I/O circuits 218 can be programmed to validate MPEG-2 bitstreams and monitor the content of the streams to ensure that the appropriate content is being sent to the correct user. Although the foregoing embodiment of the invention "loop stripes" the data, an alternative embodiment may "system stripe" the data across all the disk array loops or a subset of loops.

Figure 6:
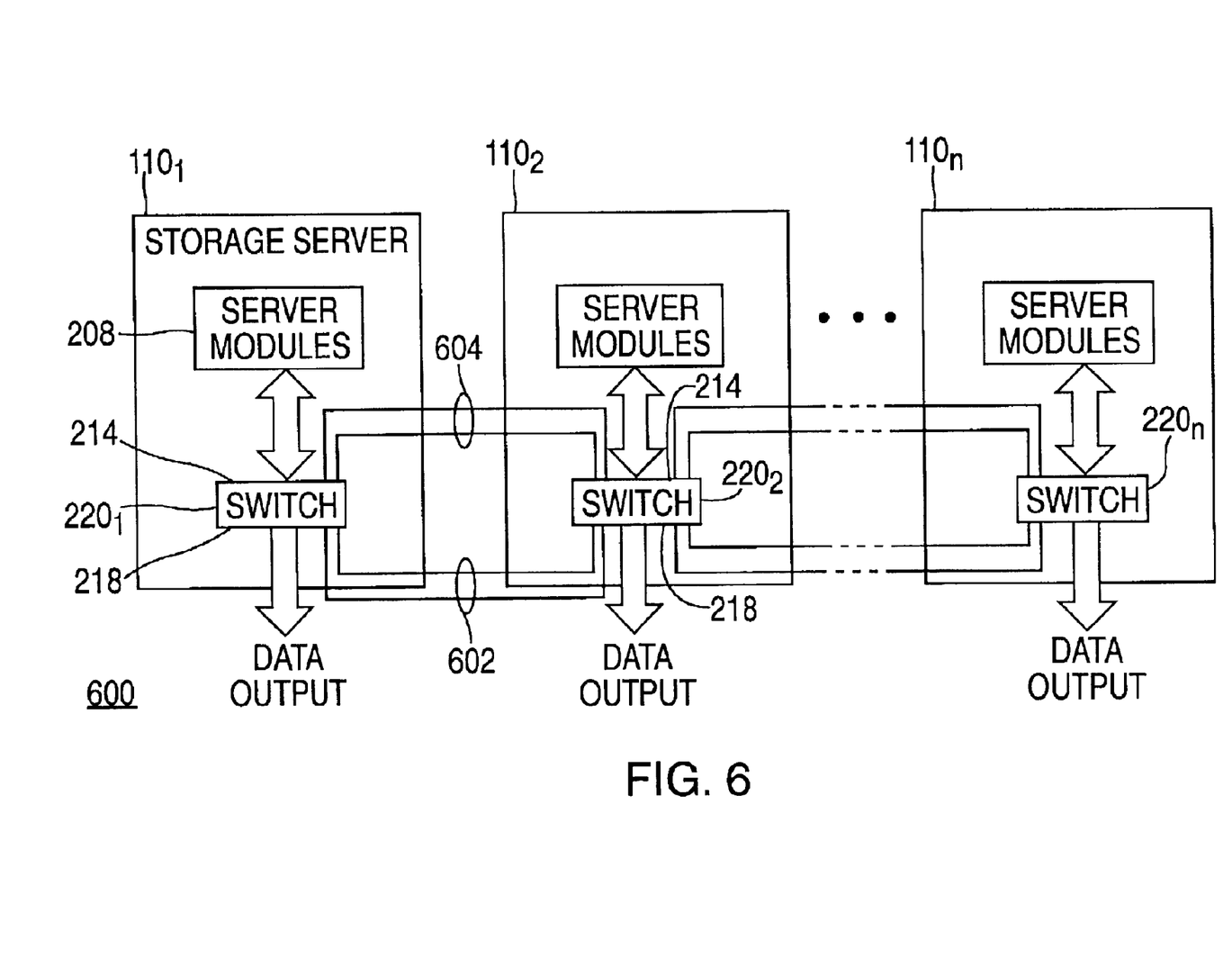
FIG. 6 depicts a block diagram of a multiple server system comprising the server of the present invention.

FIG. 6 depicts a multiple server system 600 comprising a plurality of storage servers $110_1$, $110_2$ ... $110_n$, which stores and retrieves data from a plurality of fiber channel loops. The data is routed from the server module side 214 of the switch to the modulator/demodulator side 218 of the switch. When a single server is used, all the ports on each side of the switch 220 are used to route data from the server modules 208 to the modulator/demodulators (222 in 208 FIG. 2).

To facilitate coupling a plurality of storage servers ($110_1$ through $110_n$) to one another and increasing the number of users that may be served data, one or more ports on each side of the switch are coupled to another server. Paths 602 couple the modulator/demodulator side 218 of switch 220 to the modulator/demodulator side 218 of switch $220_2$ within server $110_2$. Similarly, path 604 couples the server side parts 214 to the server side 214 of switch $220_2$. In this manner, the switches of a plurality of servers are coupled to one another.

The multiple server system enables a system to be scaled upwards to serve additional users without substantial alterations to the individual servers. As such, if the switches have 8 ports on each side, the first server $110_1$ and last server $110_n$, for example, use two ports on each side for inter-server data exchange and the remaining 6 ports to output data to users. The second through n−1 servers use four ports to communicate with adjacent servers, e.g., server $110_2$ is connected to servers $110_1$ and $110_3$. Note that the number of ports used to communicate between servers is defined by the desired bandwidth for the data to be transferred from server to server.

This arrangement of servers enables the system as a whole to supply data from any server module to any user. As such a user that is connected to server $110_1$ can access data from server $110_2$. The request for data would be routed by the HEPN to server $110_2$ and the retrieved data would be routed through switches $220_2$ and $220_1$, to the user.

While this invention has been particularly shown and described with references to a preferred embodiment thereof, it will be understood by those skilled in the art that various changes in form and details may be made therein without departing from the spirit and scope of the invention as defined by the appended claims.

What is claimed is:

1. A scalable server, comprising:
   a plurality of server modules, each of said server modules comprising at least one plurality of storage devices respectively coupled to at least one bi-directional loop, and a processor and a buffer adapted for controlling said at least one plurality of storage devices;
   a cross bar switch coupled to said plurality of server modules, said server modules accepting data requests from a plurality of clients;
   at least one server controller coupled to said processors of said plurality of server modules, said at least one server controller for routing control instructions from a head-end to a particular server module;
   each of said server modules issuing data retrieval commands only to its associated plurality of storage devices; and
   at least one data communications path coupled between the respective cross bar switches of each storage server, where any of said cross bar switches is capable of routing data from any one of said server modules to said clients requesting said data.

2. The scalable server of claim 1, where each storage server cross bar switch also receives data from a remote source and routes said data to a client requesting said data.

3. The scalable server of claim 1, further comprising at least one switch coupled between said at least one server controller and said plurality of server modules.

4. The scalable server of claim 3, where each of said plurality of storage devices comprise a plurality of fiber channel storage devices formed in a fiber channel arbitrated loop.

5. The scalable server of claim 3, wherein data is striped across the storage devices of each of said at least one server module.

6. The scalable server of claim 1, wherein data stored in said server modules comprises video data.

7. The scalable server of claim 1, wherein each of said server modules comprises a Compact CPI backplane.

8. The scalable server of claim 1, further comprising a respective input/out circuit coupled to each port of each cross bar switch.

9. The scalable server of claim 1, wherein said data requests are routed through a cross bar switch corresponding to a client requesting data, and to a server module.

10. The scalable server of claim 1, wherein said data requests are routed through a communications network to a server module of any one of the storage servers.

11. The scalable server of claim 1, wherein each of a plurality of client data requests are simultaneously processed by each respective server module.

12. The scalable server of claim 11, wherein each of said plurality of client data requests is routed to a respective server module by a communications network.

13. A method for providing data to a plurality of clients, comprising:

routing each of a plurality of client data requests to any of a plurality of server modules, each of said server modules having associated with it at least one plurality of storage devices respectively coupled to at least one bi-directional loop, and a processor and a buffer adapted for controlling said at least one plurality of storage devices, each plurality of storage devices providing data to clients via a crossbar switch, each crossbar switch serving each of the server modules within a storage server;

determining, which particular server module has associated with it a plurality of storage devices including requested data;

routing, via at least one server controller associated with said particular server module, control instructions from a head-end to said particular server module; and routing to each of said clients, respective requested data via said crossbar switch.

14. The method of claim 13, wherein said routing to each of said clients step further comprises, routing data striped across each respective plurality of storage devices of each server module.

15. The method of claim 13, wherein said routing to each of said clients step further comprises routing video data to clients requesting said data.

16. The method of claim 13, wherein said routing to each of said clients step further comprises routing simultaneously, said requested data to respective clients initiating said client data requests.

17. The method of claim 13, wherein said routing each of the plurality of client data requests step further comprises simultaneously processing each of the plurality of client data requests by each respective server module.

* * * * *